(12) United States Patent
Sedmak

(10) Patent No.: US 8,651,196 B2
(45) Date of Patent: Feb. 18, 2014

(54) POWER-ASSISTED GARDEN TOOLS

(71) Applicant: Daniel D. Sedmak, Columbus, OH (US)

(72) Inventor: Daniel D. Sedmak, Columbus, OH (US)

( * ) Notice: Subject to any disclaimer, the term of this patent is extended or adjusted under 35 U.S.C. 154(b) by 0 days.

(21) Appl. No.: 14/029,154

(22) Filed: Sep. 17, 2013

(65) Prior Publication Data

US 2014/0014378 A1    Jan. 16, 2014

Related U.S. Application Data

(63) Continuation of application No. 12/904,410, filed on Oct. 14, 2010.

(60) Provisional application No. 61/251,479, filed on Oct. 14, 2009.

(51) Int. Cl.
   *A01B 35/00*       (2006.01)
(52) U.S. Cl.
   USPC ................................. 172/40; 172/41; 172/371
(58) Field of Classification Search
   USPC ................ 172/40, 41, 42, 371, 376, 377, 36; 173/128; 74/22 R, 24
   See application file for complete search history.

(56) References Cited

U.S. PATENT DOCUMENTS

| | | | | | |
|---|---|---|---|---|---|
| 1,827,074 | A | * | 10/1931 | Ditlevsen | 172/41 |
| 2,550,522 | A | * | 4/1951 | Bolongaro | 172/40 |
| 2,553,463 | A | * | 5/1951 | McCulloch | 74/502.4 |
| 3,057,412 | A | * | 10/1962 | Hovis, Jr. | 172/42 |
| 3,756,324 | A | * | 9/1973 | Bills | 172/40 |
| 4,014,392 | A | * | 3/1977 | Ross | 173/118 |
| 4,122,902 | A | * | 10/1978 | Alexander | 172/41 |
| 4,353,422 | A | * | 10/1982 | Bennett, Jr. | 172/41 |
| 5,697,453 | A | * | 12/1997 | Van Den Bosch | 172/41 |
| 5,833,009 | A | * | 11/1998 | Rebot | 172/13 |
| 6,517,164 | B1 | * | 2/2003 | White | 299/37.5 |

* cited by examiner

*Primary Examiner* — Jamie L McGowan
(74) *Attorney, Agent, or Firm* — Dinsmore & Shohl, LLP; Joel B. Cloud

(57) ABSTRACT

Included are embodiments of a power assisted garden tool. Some embodiments include a handle and an interchangeable tool implement including a garden tool end, a connection end, and an impact platform. Similarly, some embodiments include a drive mechanism coupled to the handle, the drive mechanism including a power source, a motor that provides rotational motion to a rotary shaft, and a piston coupled to the rotary shaft, the piston exhibiting reciprocating motion from the rotational motion, the piston making contact with the interchangeable tool implement, such that the reciprocating motion of the piston causes motion of the interchangeable tool implement.

16 Claims, 4 Drawing Sheets

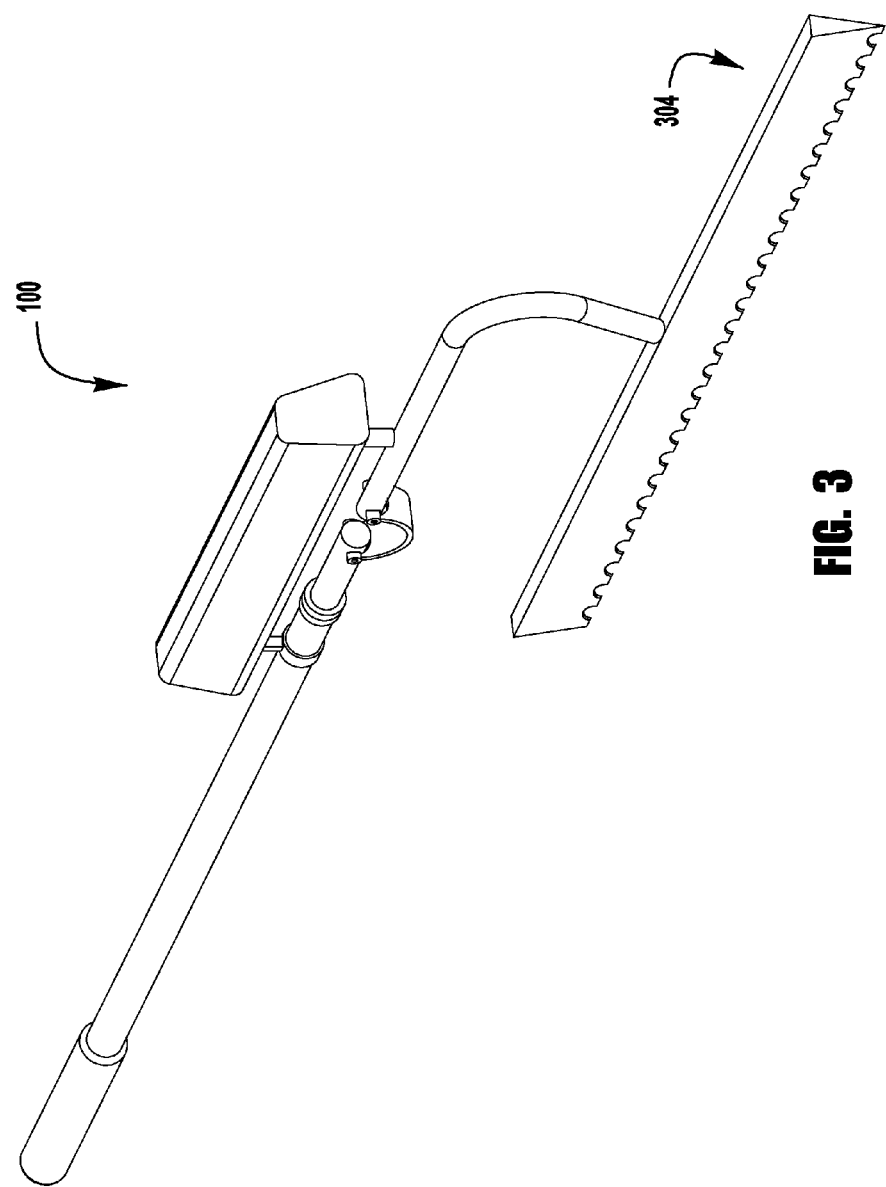

POWER-ASSISTED GARDEN TOOLS

CROSS REFERENCE

This application is a continuation of U.S. application Ser. No. 12/904,410, filed Oct. 14, 2010, which claims priority to U.S. Provisional Application Ser. No. 61/251,479, filed Oct. 14, 2009, both of which are entitled "Power Assisted Garden Tools" and are hereby incorporated by reference.

BACKGROUND

While many tools exist that assist a gardener in cultivating land, many of these tools are static, requiring the gardener to use physical strength to perform many of the tasks that the gardener requires. As an example, a garden hoe may be used to manually break up soil. While the garden hoe may be designed for performing this task, when the soil is packed and/or dry, the garden hoe may be difficult to operate. As such, the desired results may be difficult to achieve because the gardener may tire before the cultivation is complete. Additionally, an elderly and/or disabled gardener may have difficulty operating such manual tools.

SUMMARY

Included are embodiments of a power assisted garden tool. Some embodiments include a handle and an interchangeable tool implement including a garden tool end, a connection end, and an impact platform. Similarly, some embodiments include a drive mechanism coupled to the handle, the drive mechanism including a power source, a motor that provides rotational motion to a rotary shaft, and a piston coupled to the rotary shaft, the piston exhibiting reciprocating motion from the rotational motion, the piston making contact with the interchangeable tool implement, such that the reciprocating motion of the piston causes motion of the interchangeable tool implement.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals.

FIG. 3 depicts a power assisted garden tool, utilizing an edger tool implement, according to embodiments shown and discussed herein.

DETAILED DESCRIPTION

Figure 1A:
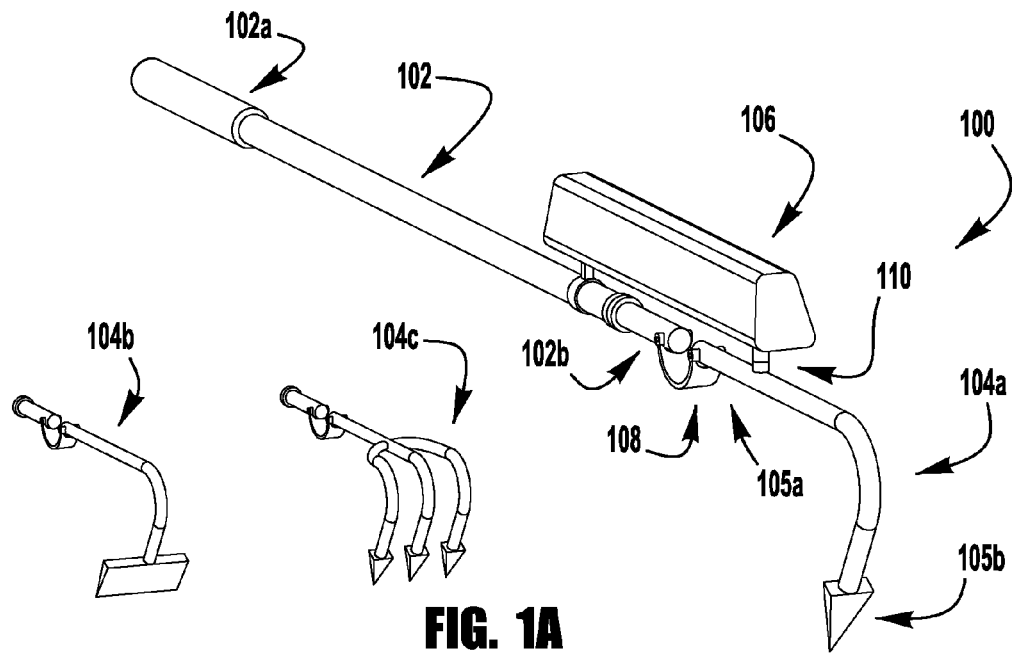
FIGS. 1A-1C depict a power assisted garden tool, according to embodiments shown and described herein.

In various embodiments are power-assisted garden tools that comprise a handle, an interchangeable tool implement selected from a variety of garden tools, a powered drive mechanism that removably couples with the tool implement and includes at least one piston that reciprocates, wherein the drive mechanism is sufficient to drive reciprocating and rapid, high impact movement of the tool implement. The tool implement, powered drive mechanism, and handle are coupled to one another, where coupling may be permanent, removable, or a combination thereof. In use, the reciprocating movement of the at least one piston causes movement of the tool implement for performing a variety of tasks as selected by the user.

According to various embodiments, the garden tool comprises tool implements that may be selected from a variety of garden tools, such as a garden hoe, a garden fork, a spade, a trowel, a weeder, a rake, a tiller, a cultivator, an edger or other like implements. Such tool implements may be removably coupled to the handle, powered drive mechanism, or a combination thereof. Thus, a variety of tool implements may be interchangeable with the garden tool, thereby allowing it to be useful for a variety of gardening applications. For example, a garden hoe tool implement may be removably coupled from the power assisted garden tool such that it may be interchanged with a tiller tool implement. In the various embodiments, the provided garden tools maintain the style and function of use of manual garden tools. For example, a power-assisted garden tool with a hoe-like tool implement may look similar to and have the same overall function as a manual garden hoe. Thus, in some aspects, the provided garden tools enhance operation of garden tools.

Motion of the tool implement is driven by the powered drive mechanism. Motion may be achieved in a variety of ways. In some embodiments, the mechanism for coupling the tool implement to the handle, powered drive mechanism, or combination thereof may allow the tool implement to move in a first direction along a longitudinal axis of the tool and second direction opposite the first direction (for example, downward and upward motions) in response to the reciprocating piston. In certain embodiments, only the motion in a first direction (for example, a downward motion) of the tool implement is driven by the piston. In such embodiments, the coupling mechanism is a an elastic component, such as a spring-hinge or similar mechanism, that has sufficient stored energy when in a first position along the first direction (for example, a downward position) to create a force that assists in movement of the tool implement along a second direction opposite the first direction from the first position (for example, the downward position) to a second position (for example, its resting position). In some embodiments, both the motions in the first and second directions (for example, downward and upward motions) of the tool implement are driven by the piston and the coupling mechanism (for example, a flexible member that may be, but is not required to be, a portion of the tool implement) allows the tool implement to continuously move in first and second directions (for example, upward and downward motions) in response to the reciprocating piston. The spring-like movement of the tool implement may be driven by an elastic component using a material with high elasticity (including, but not limited to spring steel) in a distal portion of the handle or in the tool implement that is adjacent to, but separate from, its coupling mechanism.

Similarly, in some embodiments, the mechanism for coupling the tool implement to the handle, powered drive mechanism, or combination thereof may allow the tool implement to move in a first direction transverse to or at some angular direction relative to a longitudinal axis of the tool (for example, sideways motions) in response to the reciprocating piston. In some embodiments, the piston may drive the tool implement towards a first position (for example, a left position), and an elastic component, such as a spring-hinge or other suitable coupling mechanism, has sufficient stored energy when in a first position to create a force that assists in movement of the tool implement from the first position to a second position (for example, a right position). In other embodiments, movement of the tool implement from a first position to a second position and from a second position to a first position are driven by the piston, and the coupling mechanism simply allows the tool implement to continuously move in response to the reciprocating piston.

In some embodiments, the mechanism for coupling the tool implement to the handle, powered drive mechanism, or combination thereof may allow the tool implement to move through a small distance in response to the reciprocating piston. In some embodiments, the movement may be of sufficient force to assist in maintaining the function of the tool implement. Similarly, in some embodiments, the piston may cause the tool implement to move rapidly and a spring, flexible member, or similar coupling mechanism allows for and assists in maintaining the rapid up and down movement of the tool implement. The terms "reciprocating" and "reciprocates," as used herein, include, but are not limited to, motion in both directions along a longitudinal axis (for example, in both directions along a longitudinal axis of a tool), in both directions transverse to or at an angular direction relative to a longitudinal axis of a tool, vertical (for example, up and down) motions, horizontal or lateral (for example, left to right and right to left motions), vibrational motions, and combinations thereof.

According to some embodiments, the garden tools include a powered drive mechanism with at least one piston that reciprocates. An example of a drive mechanism is the Craftsman NEXTEC™ Hammerhead Auto Hammer. The force exerted by the piston(s) is sufficient to drive the motion of the tool implement for the particular application. In some embodiments, the drive mechanism of the garden tools described herein provides sufficient force to drive the tool implement downward into an object, such as soil and/or ground cover or to drive a gear in the tool implement.

In some embodiments, the powered drive mechanism may comprise more than one piston. For example, the drive mechanism may include two impact pistons, two drive pistons, or a combination of impact and drive pistons. According to the various embodiments, the rate of reciprocation of the piston(s) can be varied using appropriate mechanisms, such as a potentiometer or rheostat, as needed for a particular application and all pistons may reciprocate at the same rate or independently.

In some embodiments, at least one piston may be an impact piston that, when moving in a first direction (for example, downward position), forcibly contacts the tool implement (and/or impact platform) and transfers the force (for example, downward force) to the tool implement, causing it to move in a first direction (for example, downward motion such as, for example, pivotally). If the tool implement is coupled to the handle, drive mechanism, or combination thereof by an elastic component, such as a spring-hinge mechanism, a first direction movement (for example, downward movement) of the tool implement causes the spring-hinge mechanism to create a second direction force (for example, an upward force) that assists in returning the tool implement to a second position (for example, an upward position). Thus, in those embodiments where the piston is an impact piston, the tool implement reciprocates in response to the impact piston.

In embodiments where the tool implement includes a gear mechanism and the piston is an impact piston, the piston causes the tool implement to rotate. In such embodiments, the piston strikes a gear (e.g., at an impact platform on a gear mechanism) in the tool implement and provides sufficient force to make the gear move, wherein movement of the gear causes movement of other components of the tool implement. For example, an impact piston may force a rotary gear to move, wherein movement of the gear causes rotary movement of blades, and/or teeth (such as in a tiller, weeder, or edger attachment).

In still some embodiments where the piston is an impact piston, the powered drive mechanism may also comprise one or more coil springs. A coil spring may be positioned such that movement of the piston to the downward position causes compression of the spring, and the energy stored by such compression creates a force in a first direction (for example, an upward force) on the piston that assists the piston in moving from a second position (for example, a downward position) to the first position (for example, the upward position). A coil spring may also be positioned such that movement of the piston to the first position causes compression of the spring, and the energy stored by such compression creates a force in the second direction on the piston that assists the piston in moving from the first position to the second position.

In some embodiments, the at least one piston of the powered drive mechanism may be a drive piston that is coupled, either removably or permanently, to the tool implement, such that when the piston moves to the downward position, the downward motion is transferred to the tool implement. Thus, the downward motion of the drive piston may drive the tool implement into an object, such as soil or ground cover, and the motion of the drive piston in a first direction (for example, in an upward direction) may pull the tool implement from the object to a first position (for example, an upward position, relative to ground). Thus, in certain embodiments, the tool implement reciprocates in response to the drive piston. In still some embodiments, the drive piston causes the tool implement to rotate (for example, angularly). In such embodiments, the drive piston may be removably coupled to a gear in the tool implement such that as the piston moves to the downward position, the gear moves and causes movement of other components of the tool implement. For example, a drive piston may force a rotary gear to move, wherein movement of the gear causes rotary movement of blades, twine, or teeth (such as in a tiller, weeder, or edger attachment).

According to some embodiments, the powered drive mechanism may include a cam assembly for transferring the rotary motion of the motor shaft to the reciprocating motion of a piston. Any suitable cam assembly may be utilized, provided that when the motor is activated, the shaft rotates to drive one or more gears and the rotary motion of the gears is converted to reciprocating piston motion. In some embodiments, a suitable gear assembly may comprise an ellipse that is attached at its center to the end of the motor shaft such that the ellipse face is perpendicular to the long axis of the shaft. The outside rim of the ellipse may be in constant contact with, but not mechanically attached to, one end of a piston, wherein the constant contact is maintained through the force of a spring that pushes the piston toward a first position, for example, an upward position (e.g., against the ellipse edge). The rotation of the motor shaft rotates the ellipse to force the piston to the downward position and then allows the piston (through the force of the spring) to return to the first position. Thus, the turning ellipse causes the piston to reciprocate. In other embodiments, a suitable gear assembly may comprise a circular disk that is attached at its center to the end of the motor shaft such that the diameter of the disk face is perpendicular to the long axis of the shaft. A rod is attached at one end to the periphery of the opposite disk face such that the rod is substantially parallel to the diameter of the disk face. The other end of the rod is attached to one end of a piston. The rotation of the motor shaft rotates the disk to force the rod to alternate between first and second positions (for example, upward and downward positions), and such motion is transferred to the piston to cause it to reciprocate.

The drive mechanism may be powered by a motor comprising a rotary shaft. The motor can be selected from any suitable motor capable of providing sufficient torque to power the drive mechanism and cause reciprocation of the piston and movement of the tool implement. For example, the motor may be a combustion, electric, or hydraulic motor. In certain embodiments, the garden tools of this disclosure include an electric motor that is powered by a battery (for example, a lithium-ion battery) or by AC current (for example, by plugging into an electrical outlet). A suitable electric motor is one that is capable of rotating the motor shaft at a high rate (within a range of about 10 revolutions per second to about 100 revolutions per second) and high torque (e.g., about 360 inch-pounds to about 600 inch-pounds of torque) to cause the reciprocating piston to reciprocate at a rate suitable for the application. Accordingly, rotation rate may be selected from about 10 revolutions per second to about 20 revolutions per second, from about 20 revolutions per second to about 30 revolutions per second, etc. Additionally, torque may be selected from about 500 inch/pounds to about 550 inch/pounds, from about 550 inch/pounds to about 600 inch/pounds, etc. As one example, a 6 volt or 12 volt motor could be used to provide the desired rotation and torque. It should be apparent to one of skill in the art that other motors could be used and this disclosure is not limited to the disclosed motor outputs. The motor used in the garden tools of this disclosure may also have a mechanism for controlling the speed (e.g., revolutions/second) of the motor shaft, such as a variable speed controller that is located in handle. In some embodiments, the variable speed controller may take the form of a trigger, knob, button, and/or other configurations.

According to various embodiments, the garden tools include a handle portion. The handle portion may be of any suitable shape for effective use and operation of the garden tool. For example, the handle portion may be a rod or have some other configuration such as an ergonomically shaped hand grip or pair of opposing grips, or combinations of these shapes. The handle portion may also be of any suitable length for effective use and operation of the garden tool. For example, the handle portion may be from about 48 inches to about 60 inches; and in some embodiments, from about 4 inches to about 12 inches. Thus, the power assisted garden tool of this disclosure may be, but is not required to be, a hand-held tool.

Additionally, the handle portion may be of an adjustable length, thereby allowing a user to adjust the handle to meet specific application and/or comfort needs. In certain embodiments, the handle portion is permanently coupled to the powered drive mechanism and removably coupled to the tool implement. In some embodiments, the handle is permanently coupled to the tool implement and removably coupled to the powered drive mechanism. In further embodiments, the handle is removably coupled to both the tool implement and powered drive mechanism. It will thus be apparent to one of ordinary skill in the art that any of a variety of configurations of the components is possible, so long as the engagement of the tool implement and the power drive mechanism is configured to provide operation of the power assisted garden tool.

In some aspects, the provided power assisted garden tool may be handheld tools or may have wheels (such as wheels that interact with the object, such as ground, to assist movement along the object). Nevertheless, in some aspects, some embodiments of the power assisted garden tool are generally lightweight (less than about 15 lbs) and used for operation in relatively small spaces (for example, in the yard of a house rather than on a commercial farm).

An appreciation of this disclosure and the many embodiments thereof will be readily obtained as the same becomes better understood by reference to the following examples and accompanying drawings, which describe and illustrate garden tool implements and modes of garden tool function for use as described herein.

Figure 1B:
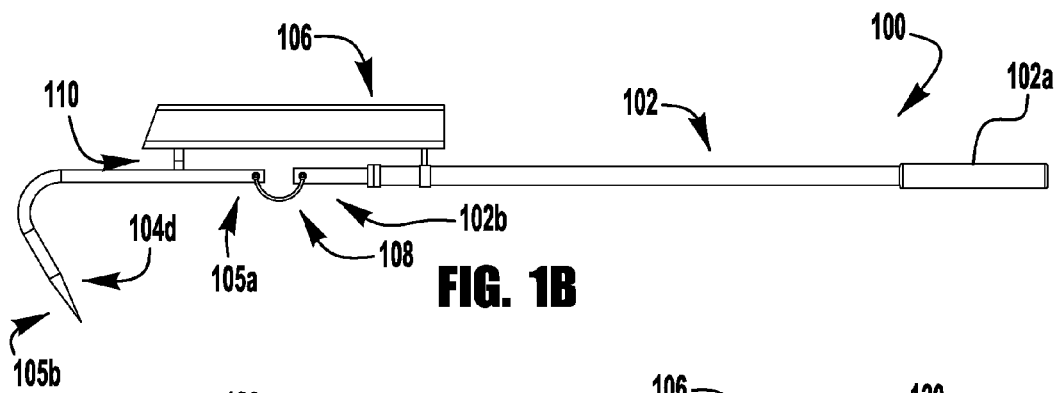
Figure 1C:
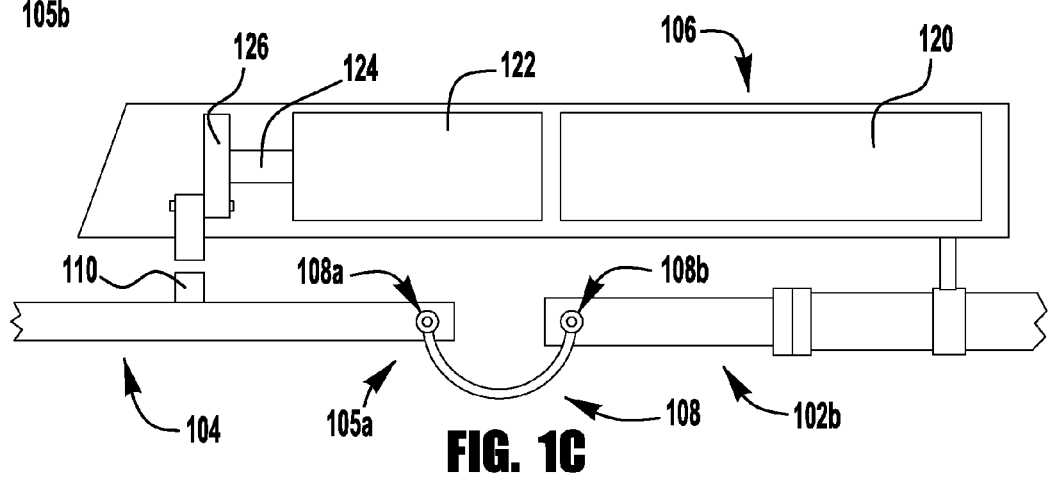

Referring now to the drawings, FIGS. 1A-1C depict a power assisted garden tool 100, according to certain embodiments shown and described herein. Referring specifically to FIG. 1A, the power assisted garden tool 100 may include a handle 102 and a tool implement 104 (e.g., 104a, 104b, 104c), which includes a connection end 105a and a garden tool end 105b. The handle 102 may be any length, but in some embodiments is about 48 inches to about 60 inches in length. Similarly, in still some embodiments, the handle 102 co-linear with the tool implement and is about 4 inches to about 12 inches in length. In still some embodiments, the handle may be adjustable to a plurality of different lengths. The handle 102 may include a grip portion 102a for a user to hold, as well as an end portion 102b for receiving a drive mechanism 106. The end portion 102b of the handle 102 may be configured for coupling to an elastic component, such as a spring hinge 108. In some embodiments (not explicitly shown) the spring hinge may reside in the handle 102 and not in the tool implement 104. Similarly, in some embodiments, the spring hinge may be replaced by using a material with high elasticity (such as, but not limited to spring steel) in the handle 102 or in the tool implement 104 that is adjacent to, but separate from, its coupling mechanism. As more clearly illustrated in FIG. 1C, the spring hinge 108 connects the connection end of the tool implement 104 to the first connection point 108a and the handle 102 with the second connection point 108b to allow a pivotal motion of the tool implement 104 relative to the handle 102. As shown, the power assisted garden tool comprises a longitudinal axis extending horizontally in FIG. 1B.

Similarly, the tool implement 104 may be removably attached to the spring hinge 108. It should be understood that while the tool implement 104 may be configured as a tiller tool implement 104a, other tool implements may be utilized, such as a hoe tool implement 104b, a triple tiller tool implement 104c, an angled hoe tool implement 104d (FIG. 1B), and/or other attachments.

Referring specifically to FIGS. 1B and 1C, the handle 102 may be coupled to the tool implement 104 by both the spring hinge 108 and the drive mechanism 106. The drive mechanism may include a power source 120, a motor 122, a rotary shaft 124, and a piston 126, which may intermittently contact the tool implement 104, as described herein. In some embodiments, the power source may 120 include a battery and may send power to the motor 122. In such an embodiment, the motor 122 may be an electric motor (such as a 6V, 12V motor). Similarly, in some embodiments, the power assisted garden tool 100 may be configured for a plug-in power source 120. Thus, the motor 122 may be configured to receive alternating current (AC) and/or includes an AC to direct current (DC) converter. Regardless, the motor 122 may be configured to operate within a range of about 10 revolutions per second to about 100 revolutions per second, depending on the embodiment, and may include a speed adjuster (not explicitly shown) to control the speed of the motor 122.

The motor 122 can then generate axial rotational motion to the rotary shaft 124 (e.g. the rotary shaft 124 spins on the axis of its length), which causes reciprocating motion to the piston 126. This reciprocating motion causes the piston 126 to repeatedly contact an impact platform 110 on the tool implement 104. Upon the piston 126 striking the impact platform 110, the force generated by the piston overcomes the tension of the spring hinge 108, forcing the tool implement in a rotational, downward motion (for example, counterclockwise motion in FIG. 1B), towards an object, such as the ground. The spring hinge 108 forces the tool implement 104 in a pivotal, upward motion (for example, clockwise motion in FIG. 1B). The timing of the piston strike, the elasticity of the spring hinge, and the distance the tool implement 104 travels can be coordinated such that as the tool implement 104 substantially returns to the upward position, the piston 126 again strikes the impact platform 110, thus repeating the process. Consequently, the tool implement 104 is repeatedly striking the object at a high rate, thus increasing force transferred to the object and improving performance of the power assisted garden tool 100.

It should be understood that, while the embodiment of FIGS. 1A-1C illustrate a single piston, this is merely an example. In some embodiments, the motor 122 may be configured with a plurality of pistons that strike a plurality of different portions of the tool implement 104 at different times. By increasing the number of pistons, the effective speed of the motor 122 may increase. Similarly, it should also be understood that, while in FIGS. 1A-1C, a spring hinge is utilized, some embodiments may be configured such that the tool implement 104 may be replaced with a tool implement that does not utilize a spring hinge (or other elastic component). In such embodiments, the end portion 102b may be removable (such as but not limited to via a threaded screw) from the rest of the handle 102. Additionally, a different tool implement (such as cultivator tool implement 404 from FIGS. 4A-4C) may be attached.

Additionally, while the embodiments described in FIGS. 1A-1C illustrate a rotational motion of the rotary shaft 124 created by the drive mechanism 106, this is merely an example. In some embodiments, the drive mechanism 106 is configured to create linear force, without the use of the rotary shaft 124. Such embodiments may instead be configured as an electric solenoid to create the desired reciprocating motion.

Figure 2:
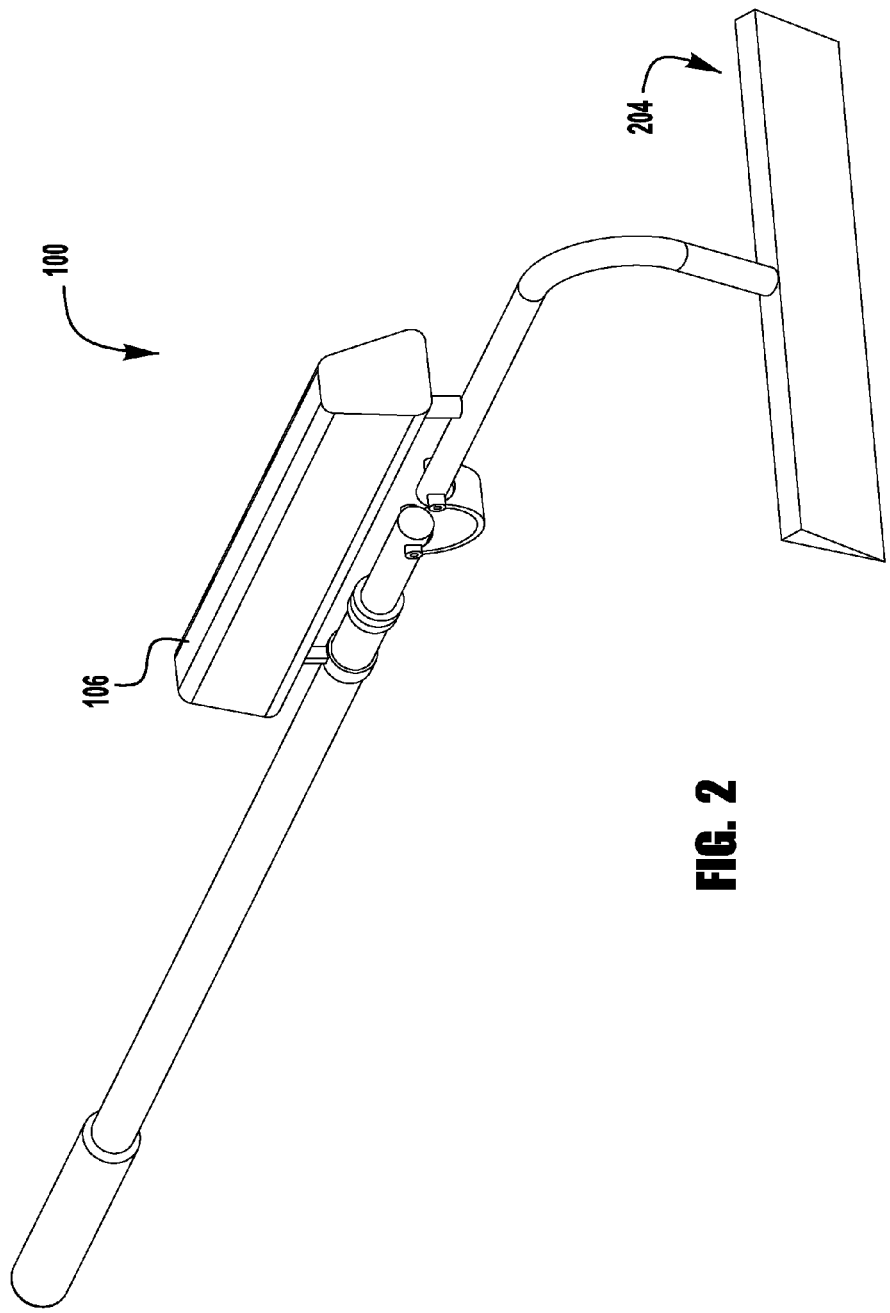
FIG. 2 depicts a power assisted garden tool, utilizing a weeder tool implement, according to embodiments shown and discussed herein.

FIG. 2 depicts a power assisted garden tool 100, utilizing a weeder tool implement 204, according to certain embodiments shown and discussed herein. As illustrated, the weeder tool implement 204 may be interchangeably used with the power assisted garden tool 100 of this disclosure, wherein such implement has a knife-like blade edge. The drive mechanism 106 provides sufficient reciprocating motion of the piston 126 to cause the weeder tool implement 204 to move through soil and/or ground cover, with a reciprocating motion as described above, to sever roots of weeds. For example, while 30 strikes/second of an impact piston may be sufficient, a range of revolutions per second discussed above may be utilized.

FIG. 3 depicts the power assisted garden tool 100, utilizing an edger tool implement 304, according to certain embodiments shown and discussed herein. As illustrated, an edger tool implement 304 may be interchangeably used with the power assisted garden tool 100 of this disclosure, wherein such implement has a serrated knife-like blade that provides cutting action through object (such as turf). As described above, the edger tool implement 304 reciprocates via a drive piston and/or an impact piston interacting with the edger tool implement 304. Such reciprocating motion causes the edger tool implement 304 to move toward an object (such as ground) in a repeated manner, to assist a gardener in edging a piece of land.

FIG. 4 depicts a power assisted garden tool 400, utilizing a cultivator tool implement 404, according to certain embodiments shown and discussed herein. As illustrated, the power assisted garden tool 400 may include a handle 402 and the cultivator tool implement 404. The cultivator tool implement 404 may be interchangeably used with a garden tool of this disclosure, wherein movement of the reciprocating piston 426 to the downward position causes a gear mechanism 404a (which includes a plurality of gears) to move, thereby converting the reciprocating motion of the piston to rotary motion of the gear mechanism 404a. In some embodiments the handle 402 is coupled to the cultivator tool implement 404 via a connection assembly 408. The drive mechanism 406 causes the piston 426 to interact with the gear mechanism 404a of the cultivator tool implement 404. More specifically, the gear mechanism 404a may include a plurality of gears, which may be configured as impact platforms to intermittently contact the piston 426. The connection assembly 408 may be configured as a threaded screw mechanism and/or other mechanism for removably securing the cultivator tool implement 404 to the handle 402.

Figure 4A:
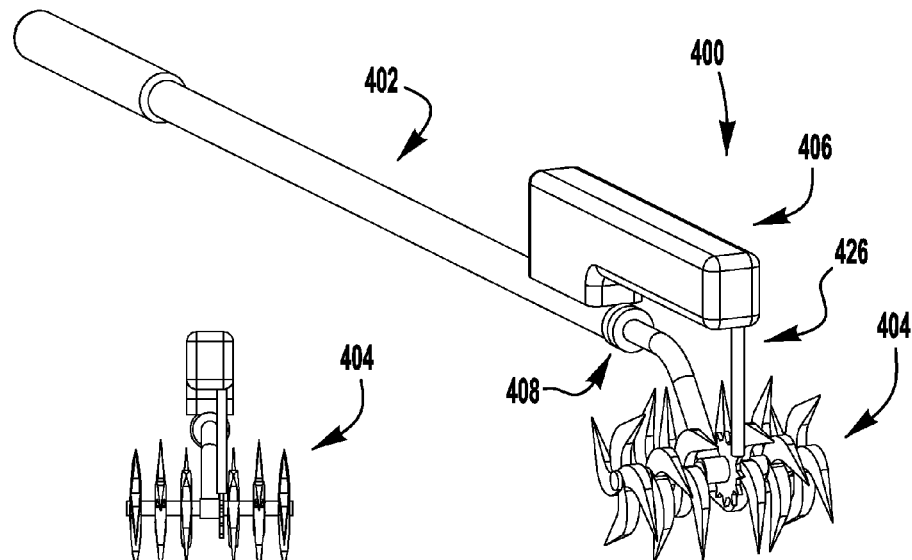
FIGS. 4A-4C depict a power assisted garden tool, utilizing a cultivator tool implement, according to embodiments shown and discussed herein.
Figure 4B:
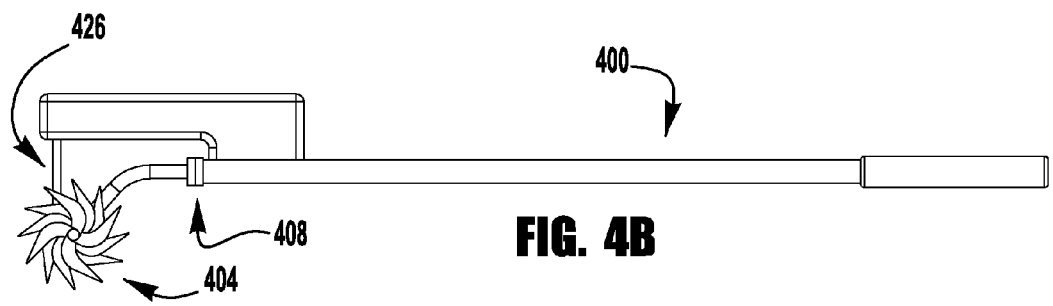
Figure 4C:
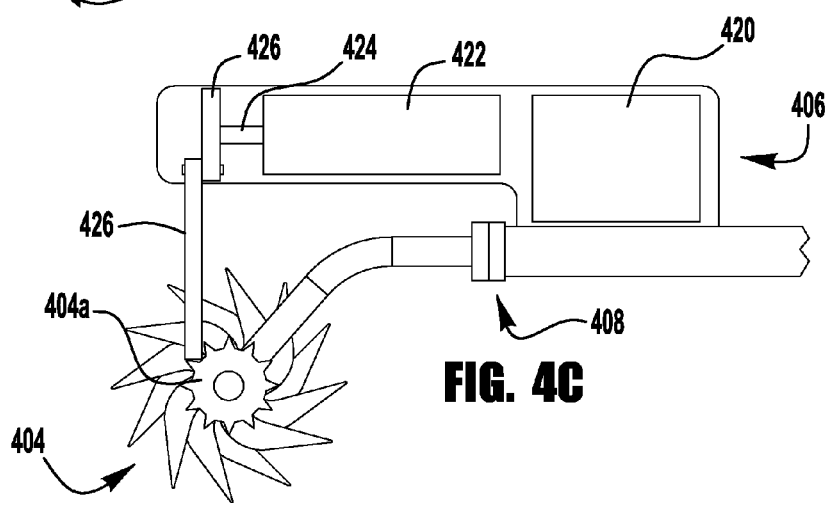

Referring specifically to FIGS. 4B and 4C, the drive mechanism 406 includes a power source 420 that is coupled to a motor 422. The motor 422 causes a rotary shaft 424 to rotate. This rotation engages the piston 426 in a repeated reciprocating motion, such as linear motion (e.g., up and down). This repeated reciprocating motion engages the gears of the gear mechanism 404a of the cultivator tool implement to create a rotation motion of the cultivator tool implement 404.

It should be understood that while in some embodiments, the piston 426 is longer than the piston 126 from FIGS. 1A-1C, this is one exemplary embodiment. More specifically, in some embodiments the piston 426 may be configured similar to the piston 126, from FIGS. 1A-1C. In such embodiments, the piston 426 may include (and/or be coupled to) an extension piece (not explicitly shown) to allow the piston 426 to interact with the gear mechanism 404a. In such embodiments, the extension piece may be separate and reversibly coupled to the piston 426 and may be separate from the gear mechanism 404a (as an impact piston) and/or be permanently or removably coupled to the gear mechanism (as a drive piston). Similarly, in some embodiments, the cultivator tool implement 404 may not be angled as illustrated in FIGS. 4A-4C, instead extending straight from the handle 402. In such embodiments, the gear mechanism 404a can directly interact with the piston 426, from FIGS. 1A-1C, without the use of an extender. Such embodiments may be configured such that the tool implements 104, 204, 304 (and/or other tool implements) may be interchanged in the power assisted garden tool 400 of FIG. 4.

It should also be understood that the embodiment of FIGS. 4A-4C may be configured with similar specification as described in reference to FIGS. 1A-1C. As an example, the motor 422 may be configured to operate with a range of about 10 revolutions per second to about 100 revolutions per second. Similarly, the motor 422 may be configured as an adjustable motor, so the gardener can determine the speed of the power assisted garden tool 400. Further, the handle 402 may, in some embodiments, be about 48 inches long to about 60 inches long and, in some embodiments from about 4 inches long to about 12 inches long. In still some embodiments, the handle 402 may be adjustable. Further, in some embodiments, the motor 422 includes a plurality of pistons to further increase the realized speed of the power assisted garden tool 400.

Embodiments of this disclosure may be embodied in different forms and should not be construed as limited to the embodiments set forth herein. Rather, these embodiments are provided so that this disclosure will be thorough and complete, and will fully convey the scope of this disclosure to those skilled in the art.

Unless otherwise defined, all technical and scientific terms used herein have the same meaning as commonly understood by one of ordinary skill in the art to which this disclosure belongs. The terminology used in the detailed description herein is for describing particular embodiments only and is not intended to be limiting of this disclosure. As used in the detailed description and the appended claims, the singular forms "a," "an," and "the" are intended to include the plural forms as well, unless the context clearly indicates otherwise.

Unless otherwise indicated, all numbers expressing quantities, weights, dimensions, and so forth as used in the specification and claims are to be understood as being modified in all instances by the term "about." Accordingly, unless otherwise indicated, the numbers set forth in the specification and claims are approximations that may vary depending on the desired numerical values sought to be obtained in embodiments of this disclosure. Notwithstanding that the numerical ranges and parameters setting forth the broad scope of this disclosure are approximations, the numerical values set forth in the specific examples are reported as precisely as possible. Any numerical values, however, inherently contain certain errors necessarily resulting from error found in their respective measurements.

This disclosure should not be considered limited to the specific examples described herein, but rather should be understood to cover all aspects of this disclosure. Various modifications, equivalent processes, as well as numerous structures and devices to which this disclosure may be applicable will be readily apparent to those of skill in the art. Those skilled in the art will understand that various changes may be made without departing from the scope of this disclosure, which is not to be considered limited to what is described in the specification.

Therefore, at least the following is claimed:

1. A power assisted garden tool comprising:
   a handle;
   an interchangeable tool implement including a garden tool end and a connection end, the connection end being removably coupled to the handle, the garden tool end including a gear mechanism with a plurality of gears; and
   a drive mechanism coupled to the handle, the drive mechanism comprising:
      a power source;
      a motor that provides axial rotational motion to a rotary shaft; and
      a piston coupled to the rotary shaft, the piston exhibiting reciprocating motion from the axial rotational motion, the piston making contact with the interchangeable tool implement, such that the reciprocating motion of the piston causes the gear mechanism to rotate.

2. The power assisted garden tool of claim 1, wherein the garden tool end includes a cultivator.

3. The power assisted garden tool of claim 1, wherein the interchangeable tool implement removably couples to the handle via a connection assembly.

4. The power assisted garden tool of claim 1, wherein the piston includes at least one of the following: an impact piston that repeated and forcibly contacts the gear mechanism to cause rotation of the gear mechanism and a drive piston that is coupled with the gear mechanism, to cause rotation of the gear mechanism.

5. The power assisted garden tool of claim 1, wherein the motor is configured to operate within a range of about 10 revolutions per second to about 100 revolutions per second.

6. The power assisted garden tool of claim 1, wherein the handle is about 48 inches to about 60 inches in length.

7. The power assisted garden tool of claim 1, wherein the handle is about 4 inches in length to about 12 inches in length.

8. The power assisted garden tool of claim 1, wherein the handle is adjustable in length.

9. A power assisted garden tool comprising:
   a handle;
   an interchangeable tool implement including a garden tool end, a connection end, and an impact platform; and
   a drive mechanism coupled to the handle, the drive mechanism comprising:
      a power source;
      a motor that provides rotational motion to a rotary shaft; and
      an impact piston coupled to the rotary shaft, the piston exhibiting reciprocating motion from the rotational motion, the piston intermittently striking the impact platform of the interchangeable tool implement, such that the reciprocating motion of the piston causes motion of the interchangeable tool implement;
   wherein the garden tool end includes a gear mechanism with a plurality of gears and at least one of the following: a garden hoe, a garden fork, a spade, a trowel, a weeder, a rake, a tiller, a cultivator, and an edger.

10. The power assisted garden tool of claim 9, wherein the garden tool end includes a cultivator.

11. The power assisted garden tool of claim 9, wherein the impact piston forcibly contacts the interchangeable tool implement to cause rotary motion of the interchangeable tool implement.

12. The power assisted garden tool of claim 9, wherein the impact piston forcibly contacts the gear mechanism to cause rotation of the gear mechanism.

13. The power assisted garden tool of claim 9, wherein the motor is configured to operate within a range of about 10 revolutions per second to about 100 revolutions per second.

14. The power assisted garden tool of claim 9, wherein the handle is about 48 inches to about 60 inches in length.

15. The power assisted garden tool of claim 9, wherein the handle is about 4 inches in length to about 12 inches in length.

16. The power assisted garden tool of claim 9, wherein the handle is adjustable.

* * * * *